(12) United States Patent
Ha et al.

(10) Patent No.: US 8,839,323 B2
(45) Date of Patent: Sep. 16, 2014

(54) RANDOM BACKOFF APPARATUS AND METHOD FOR RECEIVING AUGMENTED CONTENT

(71) Applicant: Electronics and Telecommunications Research Institute, Daejeon (KR)

(72) Inventors: Jeoung Lak Ha, Daejeon (KR); Soon Choul Kim, Daejeon (KR); Seung Chul Kim, Daejeon (KR); Jung Hak Kim, Daejeon (KR); Bum Suk Choi, Daejeon (KR); Young Ho Jeong, Daejeon (KR); Jin Woo Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/793,015

(22) Filed: Mar. 11, 2013

(65) Prior Publication Data

US 2013/0239156 A1 Sep. 12, 2013

(30) Foreign Application Priority Data

Mar. 9, 2012 (KR) ........................ 10-2012-0024498

(51) Int. Cl.
*H04N 7/173* (2011.01)
*H04N 21/234* (2011.01)
*H04N 21/44* (2011.01)

(52) U.S. Cl.
CPC ....... *H04N 21/234* (2013.01); *H04N 21/44016* (2013.01)
USPC ............................ 725/100; 725/116; 709/219

(58) Field of Classification Search
USPC .................................................. 709/217–232
See application file for complete search history.

(56) References Cited

U.S. PATENT DOCUMENTS

| 5,604,869 | A | * | 2/1997 | Mincher et al. | 709/232 |
|---|---|---|---|---|---|
| 6,571,932 | B1 | * | 6/2003 | Kawashima et al. | 198/494 |
| 7,526,564 | B2 | * | 4/2009 | Guo et al. | 709/231 |
| 7,584,491 | B2 | * | 9/2009 | Bruckner et al. | 725/36 |
| 7,779,145 | B2 | * | 8/2010 | Harada | 709/232 |
| 7,817,609 | B2 | * | 10/2010 | Law et al. | 370/338 |
| 8,155,661 | B2 | * | 4/2012 | Gerlach | 455/453 |
| 8,427,994 | B2 | * | 4/2013 | Dugoujon et al. | 370/312 |
| 2012/0047531 | A1 | * | 2/2012 | Eyer | 725/37 |

* cited by examiner

*Primary Examiner* — Annan Shang
(74) *Attorney, Agent, or Firm* — Ladas & Parry LLP (57) ABSTRACT

Provided is a random backoff apparatus and method for receiving augmented content that may prevent a delay or a down of a server caused by a plurality of receiving terminals accessing a server simultaneously, when a digital broadcasting system provides broadcast-based bidirectional broadcasting services over a communication network. That is, a technology for distributing receiving terminals accessing a server to receive augmented content, or accessing a home page of a corresponding program, based on metadata transferred from the digital broadcasting system to a broadcasting network. In a bidirectional digital method, a number of requests for access to the home page or the augmented content related to the program may be received from receiving terminals at one time. Accordingly, there is a desire for a method of preventing collision caused when a plurality of stations simultaneously access a single wireless channel.

18 Claims, 10 Drawing Sheets

RANDOM BACKOFF APPARATUS AND METHOD FOR RECEIVING AUGMENTED CONTENT

CROSS-REFERENCE TO RELATED APPLICATION

This application claims the benefit of Korean Patent Application No. 10-2012-0024498, filed on Mar. 9, 2012, in the Korean Intellectual Property Office, the disclosure of which is incorporated herein by reference.

BACKGROUND

1. Field of the Invention

The present invention relates to a random backoff apparatus and method for receiving augmented content that may prevent a server delay or a server from going down as a result of a plurality of receiving terminals accessing a server simultaneously, when a digital broadcasting system provides broadcast-based bidirectional broadcasting services over a communication network.

2. Description of the Related Art

A smart television additionally provides an Internet function to a conventional digital television broadcast system, thereby enabling viewing of television programs, performing an Internet search, and executing applications or content on the Internet. The smart television may use a broadcasting service via a broadcasting network, and also may use varied content on the Internet via the wired and wireless Internet network connection. In addition, the smart television may be operated as a hub of various digital devices used at home.

An augmented broadcast may increase reality and liveliness for a viewer, and may also enable the viewer to select a desired service directly from services provided by an augmented content provider (CP), by reconciling augmented content naturally, whereas the viewer views a broadcast program unilaterally provided by a broadcaster, in conventional digital television broadcast system. Accordingly, a television and a portable receiving terminal, hereinafter referred to as a receiving terminal, may receive a conventional broadcast program, hereinafter referred to as basic content, that may be transmitted by a broadcaster, and augmented content that may augment the broadcast program. The broadcaster may transmit the augmented content associated with the broadcast program, and metadata associated with an augmented service, along with the broadcast program.

For example, an augmented broadcast may be used for an educational program. A detailed anatomical chart may be displayed using augmented content in a television program provided in a form of basic content. Detailed information about each organ and a three-dimensional (3D) graphic screen of each organ may be viewed. The 3D graphic information may be rotated at various angles, by the viewer. In particular, such augmented content may not be output depending on a user preference, and only the conventional basic content may be provided.

For an augmented broadcast, augmented content may be produced along with the broadcast program. In this instance, metadata including information about an output time, an output location, a processed event, and the like associated with the augmented content may be generated for the broadcast program. When producing the broadcast program, augmented broadcast producing equipment may be configured to generate the metadata efficiently, and a multiplexer and transmission server may be configured to multiplex and transmit the generated metadata along with the broadcast program. A smart television may output a broadcast program, and may also obtain associated augmented content based on the metadata, and may provide the viewer with the augmented content along with the broadcast program, based on regulations defined by the metadata. The augmented content may be stored in an auxiliary memory of the receiving terminal, or may be provided by a predetermined content provider via the Internet, and related information may be provided using the metadata.

An augmented broadcasting system may transmit and receive basic content, metadata, augmented data over a broadcasting network, and may transmit and receive the metadata and the augmented content over a communication network. In this instance, three methods of using the broadcasting network and the communication network may exist. In one method, the receiving terminal may receive the basic content, the augmented content, and the metadata that are transmitted from the broadcasting network, thereby using an augmented broadcast. In another method, only the basic content and the metadata may be transmitted from the broadcasting network, and the receiving terminal may receive the associated augmented content from the communication network, thereby using the augmented broadcast. In still another method, only the basic content and the metadata may be transmitted from the broadcasting network, and the receiving terminal may receive additional metadata and augmented content from the communication network, thereby using the augmented broadcast. The receiving terminal may access a uniform resource locator (URL) or a uniform resource identifier (URI) based on the metadata received over the broadcasting network to receive the related metadata and the augmented content, by the following the schemes. In one scheme, when the receiving terminal accesses the URL or the URI, the related metadata and the augmented content may be transferred directly. In another scheme, when the receiving terminal accesses the URL or the URI, the user may select desired metadata or augmented content, in a form of a website, or the like.

In general, broadcast programming may include a plurality of programs, and viewers may view a single program and move to another channel. In bidirectional digital broadcasting, information associated with a broadcast program, or augmented content of a corresponding program may be provided via a communication network. In this instance, a number of requests for access to a home page or augmented content related to a program may be received from receiving terminals at one time. Accordingly, there is a desire for a method of preventing collisions resulting from a plurality of stations simultaneously accessing a single wireless channel.

SUMMARY

An aspect of the present invention provides a random backoff apparatus and method for receiving augmented content that may enable receiving terminals to receive services from a server smoothly, by distributing accesses to a server providing the augmented content or a home page related to a program.

According to an aspect of the present invention, there is provided a random backoff apparatus for receiving augmented content, when metadata is received from a server and a first random backoff is included in the metadata, the apparatus including a receiver to instruct a request for reception of the augmented content, using the first random backoff, and a controller to request the reception of the augmented content after performing the first random backoff.

According to another aspect of the present invention, there is provided a random backoff method for receiving augmented content, the method including receiving a first random backoff to instruct a request for reception of the augmented content, and requesting the reception of the augmented content after performing the first random backoff.

EFFECT OF THE INVENTION

According to an embodiment of the present invention, by preventing a plurality of receiving terminals from simultaneously accessing augmented content or a home page related to a single program, a plurality of viewers may use a bidirectional service efficiently.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
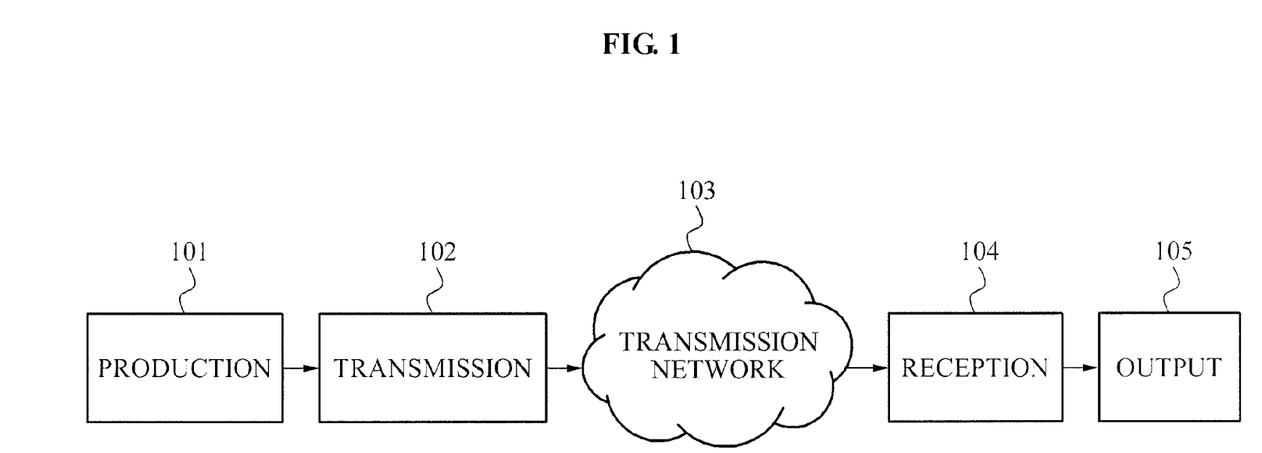
FIG. 1 is a diagram illustrating a functional configuration of a digital broadcasting system according to an embodiment of the present invention.

FIG. 1 is a diagram illustrating a functional configuration of a digital broadcasting system according to an embodiment of the present invention.

Broadcast content may be produced by a producer in operation 101, and may be transmitted through a transmitting end of a digital broadcasting system in operation 102. The produced broadcast content may be delivered to a viewer of a receiving terminal over a transmission network 103. A receiving terminal of the viewer may receive the broadcast content in operation 104, and the received broadcast content may be decoded and output through a display device or a speaker. The digital broadcasting system may generate information about basic content and augmented content, and metadata indicating a relationship between the basic content and the augmented content during production of a broadcast program for a personalized augmented broadcast. When transmitting the broadcast program, the digital broadcasting system may convert the basic content and the augmented content into a format that may be transmitted according to a transmission scheme of the transmission network 103. The transmission network 103 may be provided in a form of a broadcasting network, and may transmit a broadcast program or relay a broadcast program via a relay station. The transmission network 103 may include a communication network to transmit augmented content. The receiving terminal may include another output means, other than the display device or the speaker. The basic content and the augmented content transmitted and received over the transmission network 103 may be encoded and decoded, error-corrected, modulated and demodulated, and the like.

Figure 2:
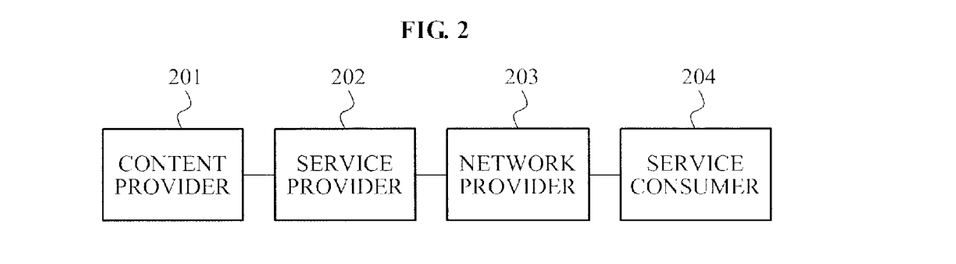
FIG. 2 is a diagram illustrating a reconfigured configuration of the digital broadcasting system of FIG. 1 using concepts of participants in a broadcasting service.

FIG. 2 is a diagram illustrating a reconfigured configuration of the digital broadcasting system of FIG. 1 using concepts of participants in a broadcasting service.

A content provider 201, a business entity providing broadcast content to a broadcaster for sale, and the like, may participate in broadcast content production directly, or may resell produced broadcast content. The broadcast content may be produced by an independent content producer, or an individual. In resale of the broadcast content, the content provider 201 may collect manufactured broadcast contents, and may sell the collected broadcast contents to a service provider 202 or a service consumer 204, directly. The service provider 20, a business entity providing a broadcasting service, may schedule the broadcast contents based on a broadcasting schedule, and may deliver the broadcast content to viewers. A network provider 203 may transmit broadcast content using a transmission line through which the broadcast content may be transmitted. A network used for the transmission line may include a broadcasting network, and a wired and wireless communication network. The service consumer 204, a viewer or a user, may use the broadcasting service or the broadcast contents as an entertainment service. A terminal used by the service consumer 204 may receive content, and also may output the content. A single business entity may become both the content provider 201 and the service provider 202, and also may become both the service provider 202 and the network provider 203. A great number of broadcasters may function as all of the content provider 201, the service provider 202, and the network provider 203.

Figure 3:
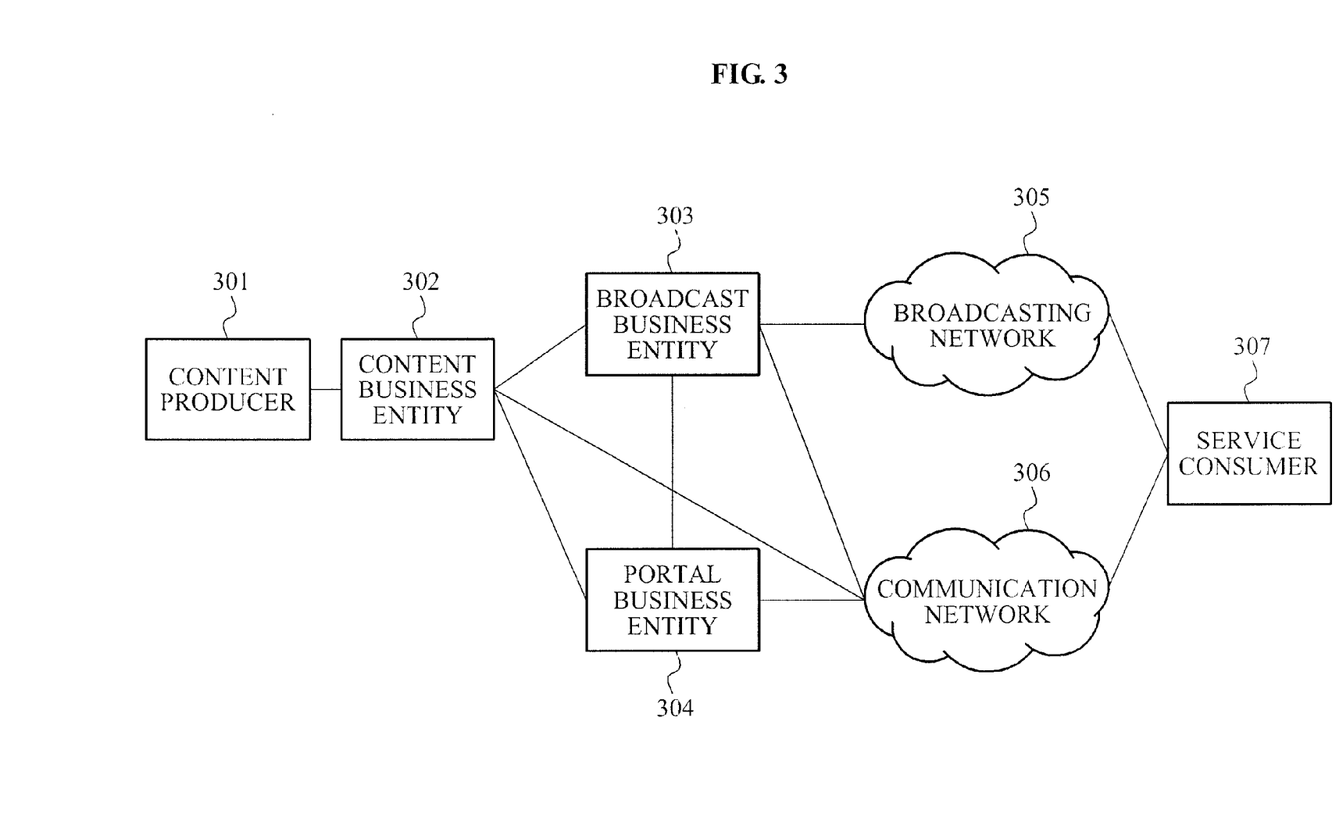
FIG. 3 is a diagram illustrating a relationship of a content provider, a service provider, and a network provider of FIG. 2.

FIG. 3 is a diagram illustrating a relationship of the content provider 201, the service provider 202, and the network provider 203 of FIG. 2. Here, the relationship of the content provider 201, the service provider 202, and the network provider 203 may be referred to as an N:N:N relationship in which a plurality of parties concerned may be entangled.

An embodiment of the present invention may be applied to a smart television, or a bidirectional broadcast that may additionally provide information that may not be provided by a broadcasting network 305, using a communication network 306, for example, a wired and wireless communication network. However, when an amount of information to be provided by sensors is sufficiently low so as to be transmitted over a broadcasting network, the information may be serviced only using a conventional digital broadcasting network. The content provider 201 may include at least one content business entity 302. The at least one content business entity 302 may cooperate with at least one content producer 301. The content provider may be the same as the at least one content producer. The service provider 202 may include a broadcast business entity 303 or a portal business entity 304. The broadcast business entity 303 may be provided with broadcast content from the at least one content business entity 302, or may produce broadcast content, directly, to provide a broadcasting service. The broadcast content may be provided over the broadcasting network 305. Augmented content enriching the broadcast content may be provided over the broadcasting network 305 when an amount of the augmented content is relatively small. Conversely, when the amount of the augmented content is relatively large, the augmented content may be provided over the communication network 306. The network provider 203 may provide the broadcasting network 305 or the communication network 306, which may provide the broadcast business entity 303, the at least one content business entity 302, and the portal business entity 304 with a path through which broadcast contents may be provided to a viewer. The portal business entity 304 may provide a viewer with augmented content directly through a contract with the broadcast business entity 303 and the at least one content business entity 302, or may provide the viewer with information about the at least one content business entity 302 having the augmented content, thereby enabling the viewer to receive the augmented content from a corresponding content business entity. The augmented content provided to the service consumer 204 or a service consumer 307, directly by the portal business entity 304 or through the at least one content business entity 302, may be provided over the communication network 306. Different forms of augmented content, for example, 002a, 002b, and 002c, may be received from a plurality of portal business entities or the at least one content business entity 302, with respect to each basic content. For example, a business entity A may provide information about a golf course using two-dimensional (2D) graphics, and a business entity B may provide information about the golf course using three-dimensional (3D) graphics. In this example, the viewer may selectively use services of the content business entities.

Figure 4:
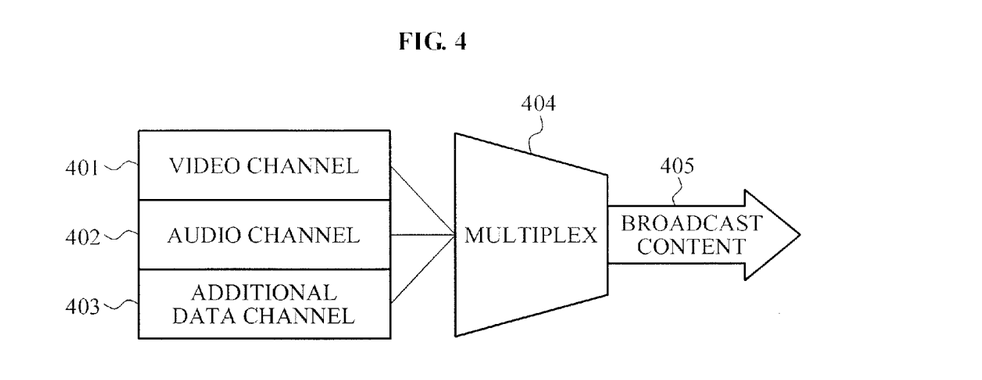
FIG. 4 is a diagram illustrating an example of multiplexing broadcast content according to an embodiment of the present invention.

FIG. 4 is a diagram illustrating an example of multiplexing broadcast content according to an embodiment of the present invention.

Broadcast content may be broadcasted in a similar manner to a television broadcast, and may be provided in a form of a video on demand (VOD) in accordance with a demand of a viewer. In a case of the VOD, the broadcast content may be multicasted in accordance with demands of a plurality of viewers. A single piece of broadcast content 405 to be received by a receiving terminal of a viewer may be configured by a multiplexing process 404 at least one video channel 401, at least one audio channel 402, and at least one additional data channel 403, and may be transmitted to a viewer. Each of the at least one video channel 401, the at least one audio channel 402, and the at least one additional data channel 403 may include basic content and augmented content. That is, the at least one video channel 401, the at least one audio channel 402, and the at least one additional data channel 403 may be multiplexed and transmitted when the basic content or the augmented content is transmitted. The basic content and the augmented content may be multiplexed simultaneously or separately, and may be transmitted without multiplexing the basic content and the augmented content depending on cases. By providing information about the augmented content, or information about whether the augmented content is present or absent in additional data of the additional data channel 403, the receiving terminal may receive the augmented content over a communication network. However, when an amount of the augmented content is relatively low, the augmented content may be included in the additional data channel 403, directly, and may be transmitted.

Figure 5A:
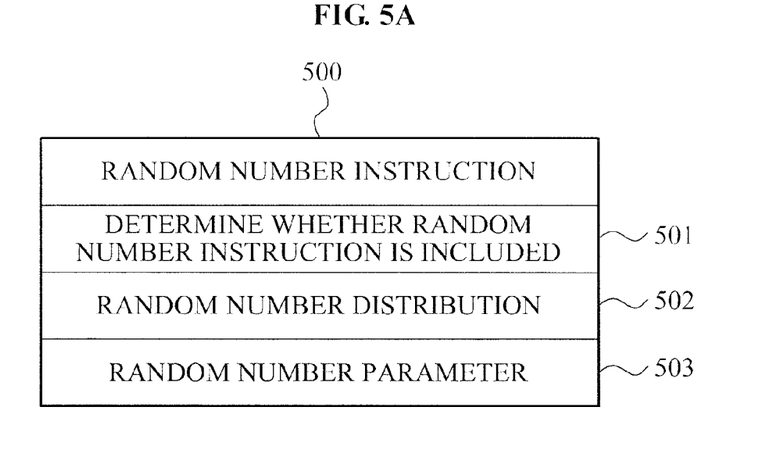
FIGS. 5A and 5B are diagrams illustrating a method and apparatus for instructing a random backoff according to an embodiment of the present invention.
Figure 5B:
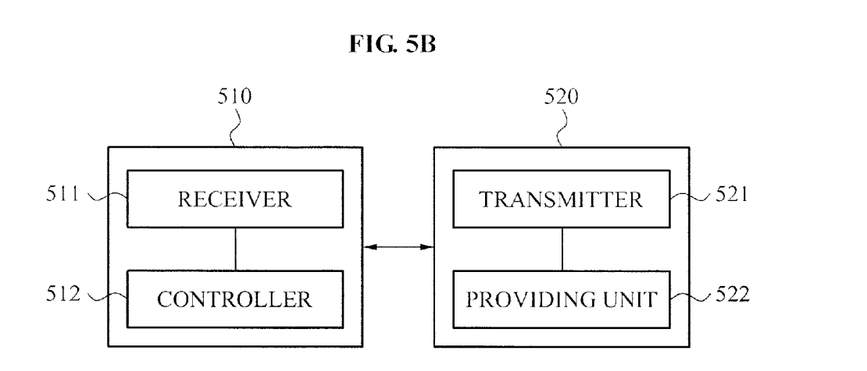

FIGS. 5A and 5B are diagrams illustrating a method and apparatus for instructing a random backoff according to an embodiment of the present invention.

Referring to FIG. 5B, a receiving terminal 510 may include a receiver 511 to receive metadata from a server 520 providing augmented content, and a controller 512 to request reception of the augmented content from the server 520 after performing a first random backoff when the first random backoff is included in the metadata. As another example, when the first random backoff is absent in the metadata, the receiving terminal 510 may generate the first random backoff, using a predetermined probability distribution and parameter, and may request the reception of the augmented content from the server 520 after performing the generated first random backoff. A method of instructing a random backoff when the receiving terminal 510 receives the augmented content after performing the first random backoff will be described herein.

For example, the receiver 511 may instruct a request for reception of augmented content from the server 520, using the first random backoff.

In this instance, the metadata may include information of the first random backoff. The controller 512 may perform the first random backoff, based on the information of the first random backoff.

In addition, the controller 512 may generate the information of the first random backoff, using the predetermined probability distribution and parameter, and may perform the first random backoff, based on the generated information of the first random backoff.

A random number instruction method 500 may correspond to an example of a method of instructing a random backoff included in the additional data channel 403. Terminals may receive instruction information of a random backoff, along with information regarding a method of receiving augmented content or an address of a home page of each program included in the additional data channel 403. The terminals may perform an instructed random backoff and attempt an access for using the augmented content or accessing the home page. Depending on a point in time at which a viewer turns on the receiving terminal 510, the instruction information may be incorporated into the additional data channel 403 in a form of a carousel at regular intervals. In this instance, each piece of the instruction information may be used in a different manner. The instruction information may be determined based on an amount of data to be used for transmitting corresponding augmented content or a corresponding home page, a volume of a program, a capacity of the server 520, a transmission characteristic of a network, and an access pattern of the viewer. In addition, the instruction information may be determined based on at least one of a uniform distribution, a normal distribution, and an exponential distribution. A point in time at which the viewer turns on the receiving terminal 510 or changes a channel may indicate a different statistical value based on an initial point of a broadcast program, and a predetermined point in time of the broadcast program. When using augmented content or accessing a home page related to a program is possible in about five minutes after the program starts, a time for a random instruction may be set to be relatively long. When using augmented content or accessing a home page related to a program is possible immediately, in about ten seconds after the program starts, a time for a random instruction may be set to be relatively short. Accordingly, the instruction information may be utilized as a different value depending on each point of time.

Information 501 indicates whether a random number instruction is included. When the information 501 is true, the random number instruction may be included in the random number instruction method 500. Conversely, when the information 501 is false, a random number distribution 502 and a random number parameter 503 may be absent in the random number instruction method 500. Depending on example embodiments, by not including the random number instruction method 500 in the additional data channel 403, an effect similar to a case in which the information 501 is false may be obtained. In this instance, a value of the random number distribution 502 and a value of the random number parameter 503 may correspond to values set in an external portion of each receiving terminal. The random number distribution 502 indicates a distribution in which a corresponding random number is generated based on a random number distribution. For example, a uniform distribution, a normal distribution, an exponential distribution, and the like may be selected. The random number parameter 503 may correspond to a value specifying a corresponding distribution depending on a type of a distribution selected from the random number distribution 502. However, when the random number distribution 502 is omitted, an identical random number distribution may be used at all times, and the random number instruction may be performed using only the random number parameter 503.

For example, the uniform distribution may be indicated as U(a, b). In this instance, when two values a and b specifying the uniform distribution are provided, the uniform distribution may be specified. The exponential distribution may be indicated as E($\lambda$), and the exponential distribution may be specified using $\lambda$. The normal distribution may be indicated as N($\mu$, $\delta^2$), and the normal distribution may be specified using $\mu$ and $\delta^2$. Accordingly, values that may specify a corresponding distribution function based on each probability distribution may be included in the random number parameter 503.

Herein, the uniform distribution may be provided as an example. The uniform distribution may occur in a uniform probability between a minimum value (a) and a maximum value (b). A great number of viewers may change a channel to a desired program in time when the corresponding program starts. In this instance, for example, accesses to the server 520 may need to be distributed for the first one second, in order to prevent receiving terminals from accessing the server 520 all at once. In this instance, when a is set to 0 millisecond (ms), and b is set to 60000 ms, requests from the viewers may be uniformly distributed for one minute. When a receiving terminal fails to receive a service of receiving the augmented content or accessing the home page of the program although the method described above is applied, a random backoff received by the random number instruction method 500 may be performed again, or a changed random number instruction may be received from the server 520. When the receiving terminal 510 receives a rejection message from the server 520, or fails to receive the augmented content within a predetermined time period, the receiving terminal 510 may re-request the reception of the augmented content by performing a second random backoff. In addition, the receiving terminal 510 may adjust a time for instructing the second random backoff, based on a point in time at which the augmented content is output. The random number instruction may be incorporated into the additional data channel 403, based on a typical viewing rate of a corresponding program, and a number of requests for a service of augmented content or an access to a home page of the corresponding program. The random number instruction received from the server 520 may be determined based on a number of requests for a service related to a corresponding episode of the corresponding program. Accordingly, a case in which a number of requests for the service may be changed depending on an episode of the program, similar to a case in which a viewing rate may be changed depending on contents or guests of an identical program, may be prepared. The server 520 may include a transmitter 521 to transmit a first random backoff including a random number instruction, in response to a request received from a receiving terminal, and a providing unit 522 to provide augmented content corresponding to an allowable capacity of a buffer, in response to a request for the augmented content received from the receiving terminal 510. The server 520 may provide first few services, that is, services corresponding to a number allowed by a buffer of the server, in response to requests received from a great number of receiving terminals 510. However, requests greater than or equal to the allowed number may be received again subsequently. In this instance, when the server 520 transmits, to the receiving terminal 510, a rejection message including the random number instruction, in response to the request from the receiving terminal 510, the receiving terminal 510 may receive the rejection message from the server 520, and the receiving terminals 510 that fail to receive the augmented content may increase a probability of receiving the service, by accessing the server 520 after waiting for a time period corresponding to a random backoff instructed by the server 520. In addition, when the receiving terminal 510 fails to receive the augmented content, the receiving terminal 510 may receive the rejection message from the server 520, generate a random backoff using a predetermined probability distribution and parameter, and may access the server 520 to request the augmented content after waiting for a time period corresponding to the generated random backoff.

Here, the server 520 may correspond to a broadcasting server, a content provider, a portal business entity, or the like. The server 520 may transmit, to a first receiving terminal, the random backoff including the random number instruction, and may transmit, to the first receiving terminal, the augmented contents corresponding to an allowable capacity of the buffer, in response to a request for the augmented content from the first receiving terminal. In addition, when the receiving terminal requests the augmented contents through autonomous determination, irrespective of the reception of the random backoff, the server 520 may provide the augmented content. For example, the server 520 may provide the augmented content corresponding to the allowable capacity of the buffer, in response to the request for the augmented content from a second receiving terminal that fails to receive the random backoff. In this instance, the random number instruction may be associated with a time at which the augmented content is to be provided to the receiving terminal 510, in relation to the use of the augmented content at the receiving terminal 510.

When a collision occurs in the access to the server 520 although the access is attempted using the method described above, the receiving terminal 510 may re-attempt the access. In addition, there may exist various methods of re-attempting the access. An identical algorithm applied to the method of instructing a random backoff in the random number instruction, similar to the method described above, may be applied. Also, the random number instruction may be transmitted from a contents providing server that rejects the request for the access. As described above, partial information of the random number instruction may be omitted under a contract between a server side and a terminal side.

In addition, the server 520 may report, to the receiving terminal 510, a number of times of re-attempts, or the receiving terminal 510 may set and manage the number of times of re-attempts internally.

As still another example, both the server 520 and the receiving terminal 510 may agree on contents of the random number instruction described above. In this instance, the receiving terminal 510 may use a random backoff by applying the random number instruction, rather than transmitting the random number instruction in reality. That is, when the server 520 does not transmit information regarding whether the random number instruction is included, and a random backoff is not received, the receiving terminal 510 may generate a random backoff using a predetermined probability distribution and parameter, and may attempt the access to the server 520 by applying the generated random backoff.

Figure 6:
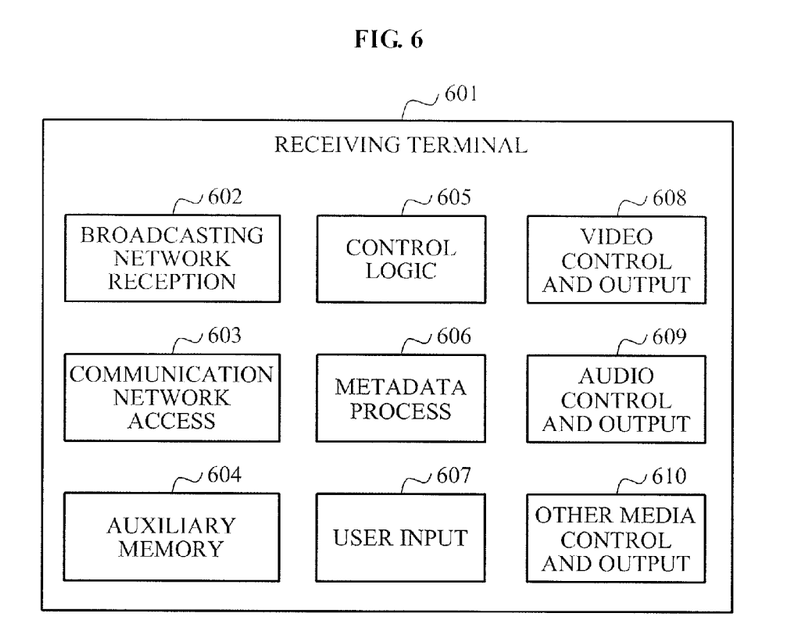
FIG. 6 is a block diagram illustrating a functional configuration of a receiving terminal outputting augmented content according to an embodiment of the present invention.

FIG. 6 is a block diagram illustrating a functional configuration of a receiving terminal outputting augmented content according to an embodiment of the present invention.

A receiving terminal 601 may have a broadcasting network reception function 602, and a communication network access function 603. The broadcasting network reception function 602 may have a protocol layer that may receive information about broadcast content transmitted as a digital broadcast. A control logic 605 may interpret other information including basic content transmitted and received over a communication network, determine whether metadata is to be processed, and request processing of the metadata by a metadata process 606. The control logic 605 may receive augmented content over a communication network based on the metadata. The control logic 605 may receive a random number instruction, and may perform a random backoff based on the received random number instruction. The communication network access function 603 may include a function of processing a protocol used for an access to a wired and wireless communication network. The control logic 605 may perform matching, synthesis, synchronization, and the like on the received augmented content with the basic content, and may output results for each media. The matching, the synthesis, and the synchronization between the basic content and the augmented content may be separated from the control logic 605, and may be realized as separate function blocks. A video control and output function 608 may refer to a function of outputting video information of the basic content and the augmented content, simultaneously. An audio control and output function 609 may refer to a function of outputting audio information of the basic content and the augmented content, simultaneously. Other media control and output function 610 may refer to a function of outputting other media information of the basic content and the augmented content. A user input function 607 may process an input of a user at an augmented broadcast receiving terminal, and may process various input schemes, for example, a motion of the user, and an input based on a conventional remote control.

Figure 7:
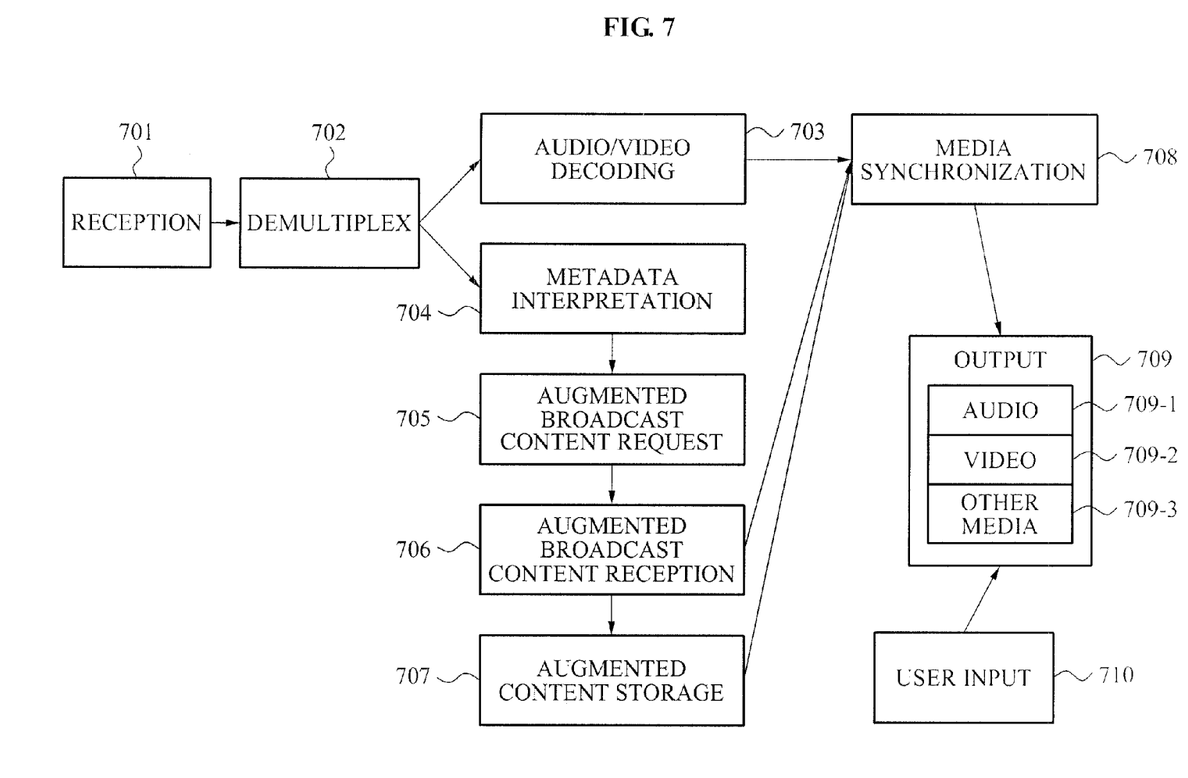
FIG. 7 is a diagram illustrating a processing process of a terminal receiving an augmented broadcast according to an embodiment of the present invention.

FIG. 7 is a diagram illustrating a processing process of a terminal receiving an augmented broadcast according to an embodiment of the present invention.

When broadcast content is received in operation 701, a terminal may perform demodulation and error correction on the received broadcast content, and may demultiplex the broadcast content in operation 702. When the demultiplexing succeeds, the terminal may decode audio and video. The audio and the video may be decoded independently or simultaneously, depending on encoding schemes. In order to synchronize basic content with augmented content in operation 708, the terminal may buffer the basic content. A predetermined amount of time may be required to receive the augmented content from a communication network based on metadata. Accordingly, for the media synchronization, the terminal may delay playback of the basic content until the augmented content is completely received. In addition, a schedule may be adjusted so that metadata associated with augmented content of a subsequent program may be transmitted in advance while a current program is being broadcasted, whereby the terminal may obtain the augmented content from a server or a content provider to perform synchronization.

The terminal may interpret the metadata in operation 704, and may request corresponding augmented content in operation 705. When the metadata is encoded by a transmission end, a process of decoding the metadata may be performed by a reception end in operation 704. The terminal may request required augmented content in operation 705, based on a result of interpreting the metadata, and may receive a corresponding result in operation 706. The terminal may store the received augmented content in operation 707, as necessary. When the required augmented content is already stored in an auxiliary storage device, or when the required augmented content is already included in data transferred over a communication network, the operations 705 and 706 may be omitted or processed internally. When the augmented content is obtained, the terminal may synchronize, in operation 708, the augmented data with the audio and the video being buffered or obtained in operation 703, and may output synchronized content in operation 709. Depending on a type of the augmented content, the augmented content may be added to the audio decoded in operation 703, and may be output in operation 709-1. Also, the augmented content may be added to the video decoded in operation 703, and may be output in operation 709-2. Further, the augmented content may be output in a form of other media in operation 709-3. The augmented content may be output in at least one of the forms described with respect to operations 709-1, 709-2, and 709-3. The other media may include, for example, oscillation, wind, scent, and the like. An output scheme with respect to the various media may be adjusted by the viewer. As like adjusting a brightness of a screen, or a volume of a speaker, the viewer may adjust an intensity of the output with respect to identical information. When the viewer views a golf course using augmented content, the terminal may provide views of the course at various angles, according to a user input 710.

Figure 8:
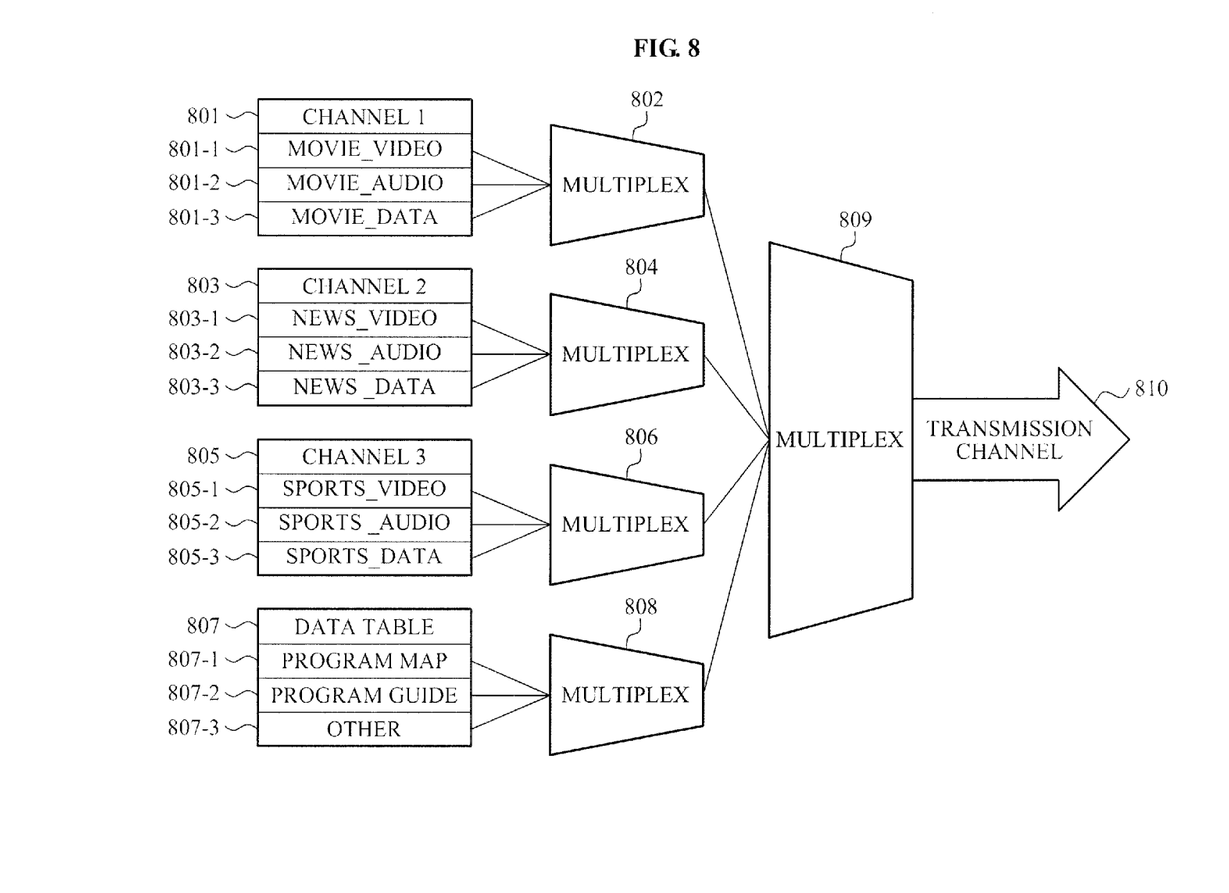
FIG. 8 is a diagram illustrating a process of multiplexing broadcast content when a Moving Picture Experts Group (MPEG)-2 is used according to an embodiment of the present invention.

FIG. 8 is a diagram illustrating a process of multiplexing broadcast content when a Moving Picture Experts Group (MPEG)-2 is used according to an embodiment of the present invention.

A transmission channel 810 through which a viewer may receive data may include at least one logical channel, for example, a first channel 801, a second channel 803, and a third channel 805 which may correspond to broadcast contents provided to the viewer, and a data table 807 which may correspond to additional information associated with the broadcast contents included in the transmission channel 810. As an example, when the first channel 801 corresponds to a movie channel, a video 801-1 of the movie, an audio 801-2 of the movie, and metadata 801-3 associated with the movie may be included and multiplexed. The multiplexing process 404 of FIG. 4 may be identical to a multiplexing process 802 of FIG. 8. That is, since the video channel 401, the audio channel 402, and the additional data channel 403 may correspond to the video 801-1, the audio 801-2, and the metadata 801-3, a video 803-1, an audio 803-2, and metadata 803-3, or a video 805-1, an audio 805-2, and metadata 805-3, the aforementioned factors may be construed as being identical functions and devices. As another example, the second channel 803 corresponding to a news channel, and the third channel 805 corresponding to a sports channel may be configured by an identical scheme. The video 801-1, 803-1, and 805-1 or the audio 801-2, 803-2, and 805-2 may be encoded for each channel. Information about each logical channel or the entire transmission channel may be additionally provided as information about the data table 807. For example, the data table 807 may include a program map 807-1 indicating information about a location of each channel in an entire multiplexing stream, program guide 807-2 providing a schedule of a program using the transmission channel 810, and a clock or other information 807-3. Information about each of the first channel 801, the second channel 803, the third channel 805, and the data table 807 may be multiplexed by a corresponding multiplexing process 802, 804, 806, or 808, may be multiplexed again in a lump by a multiplexing process 809, and may be provided in a form of a transmission stream. The augmented contents applied in the present invention may be included in areas of the metadata 801-3, 803-3, and 805-3.

Figure 9:
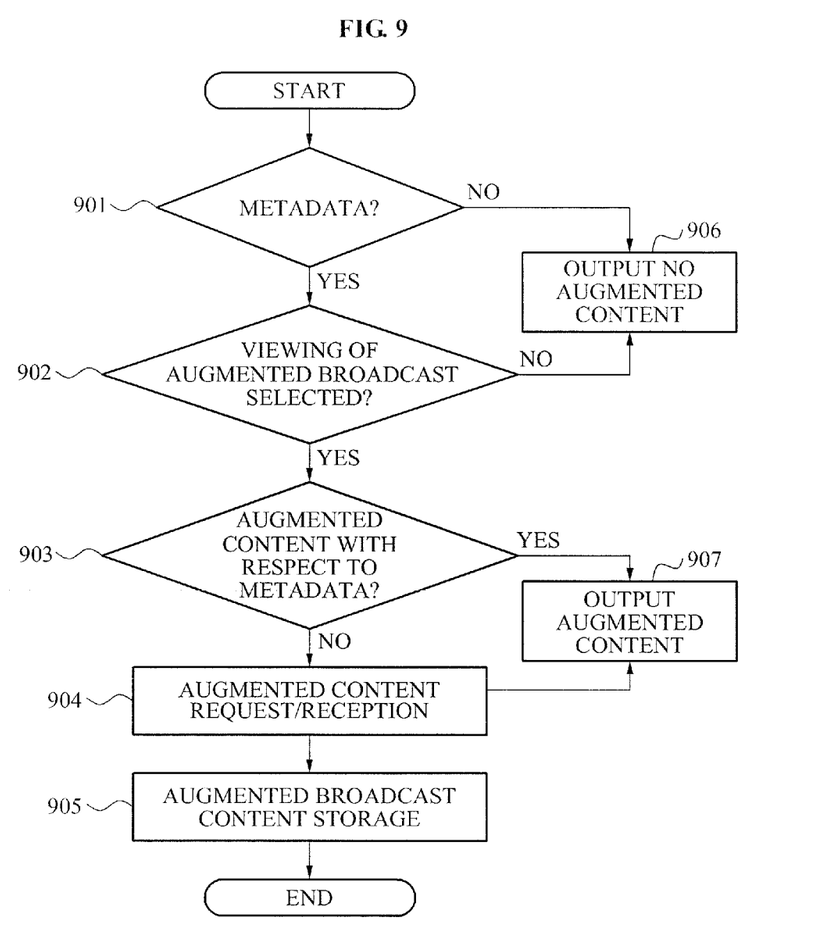
FIG. 9 is a flowchart illustrating a method of determining whether augmented content is to be output, based on received metadata according to an embodiment of the present invention.

FIG. 9 is a flowchart illustrating a method of determining whether augmented content is to be output, based on received metadata according to an embodiment of the present invention.

A terminal may demultiplex the broadcast content 405 of FIG. 4 or the broadcast content of FIG. 8 received through the transmission channel 810, and may verify whether metadata is provided, in operation 901, before interpreting the metadata. When the metadata is absent or augmented content is not included in the metadata, the terminal may not output the augmented content in operation 906. Although the augmented content exists, when a viewer does not select viewing of the augmented content in operation 902, the terminal also may not output the augmented content. When the augmented data is present as a result of interpreting the metadata in operation 903, the terminal may request and receive the augmented content in operation 904. Also, the terminal may bring the augmented content from an auxiliary storage device. In operation 905, the terminal may store corresponding augmented content for a future use, as necessary. When the augmented content is received, the terminal may output the augmented content in operation 907. The operation 907 may include media synchronization.

Since the metadata may need to be received ΔT in advance, based on a point in time of using the metadata, the metadata may be transmitted at a predetermined point in time. However, when a user turns on a television immediately before a corresponding program is started, the predetermined point in time may already pass, or another channel may be viewed at the predetermined point in time. Accordingly, the metadata may be transferred by incorporating the metadata into an electronic program guide (EPG) providing information about a schedule of the broadcast program. That is, in a digital broadcasting system, when the metadata is transmitted by incorporating the metadata into the programming information of the EPG, a receiving terminal may determine whether an augmented broadcast is to be viewed when selecting or reserving a desired program. The digital broadcasting system may transfer, to the receiving terminal, the metadata set in the programming information of the EPG, thereby enabling the receiving terminal to receive augmented content associated with the metadata in advance.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A random backoff apparatus for receiving augmented content, the apparatus comprising:
    a receiver to instruct a request for reception of the augmented content from a server, using a first random backoff; and
    a controller to request the reception of the augmented content after performing the first random backoff, wherein, when the receiver receives a rejection message from the server, or fails to receive the augmented content within a predetermined time period, the controller re-requests the reception of the augmented content after performing a second random backoff.

2. The apparatus of claim 1, wherein:
    the receiver receives metadata from the server, and
    the metadata comprise information about the first random backoff.

3. The apparatus of claim 1, wherein the controller generates information about the first random backoff, using a predetermined probability distribution and parameter.

4. The apparatus of claim 1, wherein the receiver receives instruction information of the first random backoff that is determined based on at least one of an amount of data in the augmented content and an exponential distribution.

5. The apparatus of claim 1, wherein the controller performs the second random backoff, based on information about the second random backoff included in the rejection message.

6. The apparatus of claim 1, wherein the controller generates information about the second random backoff, using a predetermined probability distribution and parameter, and performs the second random backoff based on the information about the second random backoff.

7. A server for providing augmented content, the server comprising:
    a transmitter to transmit information about a first random backoff including a random number instruction; and
    a providing unit to provide augmented content corresponding to an allowable capacity of a buffer, in response to a request for the augmented content from a first receiving terminal that receives the information about the first random backoff, or a request for the augmented content from a second receiving terminal that fails to receive the information about the first random backoff.

8. The server of claim 7, wherein the providing unit transmits a rejection message when providing of the augmented content fails.

9. The server of claim 8, wherein the rejection message comprises information about a second random backoff.

10. The server of claim 7, wherein the random number instruction comprises at least one of information regarding whether a random number instruction is included, information about a random number distribution, and a random number parameter.

11. A tangible computer readable storage medium having processor executable instructions to:
   perform a first random backoff to instruct a request for reception of the augmented content; and
   request the reception of the augmented content after performing the first random backoff, wherein the receiving comprises receiving instruction information of the first random backoff that is determined based on at least one of an amount of data in the augmented content, and an exponential distribution.

12. The tangible computer readable storage medium of claim 11, wherein the processor executable instructions include:
   receiving metadata from a server, and
   performing the first random backoff based on information about the first random backoff included in the metadata.

13. The tangible computer readable storage medium of claim 11, wherein the processor executable instructions include:
   generating information about the first random backoff, using a predetermined probability distribution and parameter; and
   performing the first random backoff, based on the generated information about the first random backoff.

14. The tangible computer readable storage medium of claim 11, wherein the receiving comprises receiving instruction information of the first random backoff that is determined based on at least one of a capacity of a server, a transmission characteristic of a network, a uniform distribution, and a normal distribution.

15. The tangible computer readable storage medium of claim 11, the processor executable instructions include:
   re-requesting the reception of the augmented content after performing a second random backoff, when a rejection message is received from the server, or the augmented content fails to be received within a predetermined time period.

16. The tangible computer readable storage medium of claim 15, wherein the second random backoff is performed based on information about the second random backoff included in the rejection message.

17. The tangible computer readable storage medium of claim 16, wherein the second random backoff is performed based on information about the second random backoff generated using a predetermined probability distribution and parameter.

18. An operating method of a server for providing augmented content, the operating method comprising:
   transmitting information about a first random backoff including a random number instruction; and
   providing augmented content corresponding to an allowable capacity of a buffer, in response to a request for the augmented content from a first receiving terminal that receives the information about the first random backoff, or a request for the augmented content from a second receiving terminal that fails to receive the information about the first random backoff.

* * * * *